US010146525B2

(12) United States Patent
Vaguine et al.

(10) Patent No.: US 10,146,525 B2
(45) Date of Patent: Dec. 4, 2018

(54) SUPPORTING HITLESS UPGRADE OF CALL PROCESSING NODES IN CLOUD-HOSTED TELEPHONY SYSTEM (71) Applicant: Cisco Technology, Inc., San Jose, CA (US)

(72) Inventors: Andre V. Vaguine, Richardson, TX (US); Mark L. Hendrickson, Lafayette, CO (US); David E. Hanzel, Murphy, TX (US); Chris Pearce, Dallas, TX (US); Rajeev Narang, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 161 days.

(21) Appl. No.: 15/171,135

(22) Filed: Jun. 2, 2016

(65) Prior Publication Data

US 2017/0353589 A1 Dec. 7, 2017

(51) Int. Cl.
*G06F 8/65* (2018.01)
*H04L 29/06* (2006.01)
(Continued)

(52) U.S. Cl.
CPC ............ *G06F 8/65* (2013.01); *H04L 41/0654* (2013.01); *H04L 43/00* (2013.01);
(Continued)

(58) Field of Classification Search
CPC ... G06F 8/65; H04L 41/0654; H04L 65/1006; H04L 65/1073; H04L 65/1083;
(Continued)

(56) References Cited

U.S. PATENT DOCUMENTS 7,007,190 B1 2/2006 Kurapati et al.
8,019,587 B1 9/2011 Venkatraman et al.
(Continued)

OTHER PUBLICATIONS

Cisco, "Cisco BTS 10200 Softswitch Technical Overview," Cisco BTS 10200 Softswitch System Description, Release 7.0, Chapter 1, Revised Jul. 2010, 28 pages.

*Primary Examiner* — Un C Cho
*Assistant Examiner* — Shah M Rahman
(74) *Attorney, Agent, or Firm* — Edell, Shapiro & Finnan, LLC (57) ABSTRACT A method is provided in which a call agent process that supports one or more Internet Protocol (IP) calls, stores to persistent memory a set of data associated with the one or more IP calls. An outage is detected affecting the one or more IP calls. Using the data retrieved from the persistent memory, the one or more IP calls are resynthesized using a device simulator process to simulate connectivity with endpoints that were participating in the one or more IP calls prior to the outage. After resynthesizing, depending on activity detected from devices associated with the one or more IP calls, the one or more IP calls are internally re-stitched/re-establishing (without signaling to endpoints) with the endpoints involved in the one or more IP calls, or the one or more calls are fully re-stitched/re-established by signaling an endpoint that was participating in the one or more IP calls.

20 Claims, 8 Drawing Sheets (51) Int. Cl.
*H04M 7/00* (2006.01)
*H04L 12/24* (2006.01)
*H04L 29/08* (2006.01)
*H04L 12/26* (2006.01)
*H04L 29/14* (2006.01)

(52) U.S. Cl.
CPC ...... *H04L 65/1006* (2013.01); *H04L 65/1073* (2013.01); *H04L 65/1083* (2013.01); *H04L 67/145* (2013.01); *H04M 7/0081* (2013.01); *H04L 69/40* (2013.01)

(58) Field of Classification Search
CPC ....... H04L 67/145; H04L 69/40; H04L 43/00; H04M 7/0081
USPC .......................................................... 370/352
See application file for complete search history.

(56) References Cited

U.S. PATENT DOCUMENTS

| | | | |
|---|---|---|---|
| 8,171,466 B2 | 5/2012 | Langen et al. | |
| 8,448,162 B2 | 5/2013 | Ramanathan et al. | |
| 9,032,053 B2 | 5/2015 | Kosuru et al. | |
| 2002/0187788 A1* | 12/2002 | McKay | H04W 76/028 455/450 |
| 2005/0213498 A1* | 9/2005 | Appanna | G06F 11/2028 370/216 |
| 2006/0159011 A1* | 7/2006 | Dalal | H04L 1/187 370/220 |
| 2007/0183357 A1* | 8/2007 | Bender | H04W 8/005 370/328 |
| 2008/0002669 A1* | 1/2008 | O'Brien | H04L 12/66 370/352 |
| 2008/0291906 A1* | 11/2008 | Chigurupati | H04L 45/00 370/356 |
| 2009/0245098 A1* | 10/2009 | Baker | H04L 41/046 370/221 |
| 2009/0245183 A1* | 10/2009 | Baker | H04L 67/16 370/329 |
| 2010/0061228 A1* | 3/2010 | Grabelsky | H04L 12/5692 370/221 |
| 2012/0131377 A1* | 5/2012 | Baird | G06F 11/1479 714/4.11 |
| 2013/0083908 A1* | 4/2013 | Kolesov | H04L 65/105 379/93.02 |
| 2014/0143413 A1* | 5/2014 | Fang | H04L 65/1016 709/224 |
| 2014/0269258 A1* | 9/2014 | Bischoff | H04L 45/22 370/221 |
| 2015/0081767 A1 | 3/2015 | Evens | |

\* cited by examiner

SUPPORTING HITLESS UPGRADE OF CALL PROCESSING NODES IN CLOUD-HOSTED TELEPHONY SYSTEM

TECHNICAL FIELD

The present disclosure relates to cloud-based telephony services.

BACKGROUND

A cloud-hosted telephony system is an alternative to on premise call management systems. One difference from on premise systems is that a cloud-hosted is managed using a continuous integration workflow. Telephone systems need to be highly reliable, so system updates need to occur without disturbing stable calls in progress. Furthermore, users desire the ability to be able to invoke features on calls that have been preserved across upgrades.

DESCRIPTION OF EXAMPLE EMBODIMENTS

Overview

In one embodiment, a method is provided in which a call agent process running on a server to support one or more Internet Protocol (IP) calls, stores to persistent memory a set of data associated with the one or more IP calls. An outage is detected affecting the one or more IP calls. Using the data retrieved from the persistent memory, the one or more IP calls are resynthesized using a device simulator process to simulate connectivity with endpoints that were participating in the one or more IP calls prior to the outage. After resynthesizing, depending on activity detected from devices associated with the one or more IP calls, the one or more IP calls are internally re-stitched/re-establishing (without signaling to endpoints) with the endpoints involved in the one or more IP calls, or the one or more calls are fully re-stitched/re-established by signaling an endpoint that was participating in the one or more IP calls.

EXAMPLE EMBODIMENTS

In cloud-deployed telephony services, it is useful to develop the service in a continuous integration environment. This results in frequent software updates. By contrast, in an on premise telephony system, upgrades are much less frequent, and thus the behavior of the call processing system is more forgiving. If an administrator were to upgrade a call processing node while calls were in progress, the phones would visibly enter a call preservation state, in which the media of the active call is preserved but in which the phone could neither receive incoming calls nor invoke features like call transfer. Call preservation ends when a user hangs up and the phone undergoes a full reregistration sequence to the new call manager.

In a frequently changing cloud environment, this behavior would dissatisfy customers and thus a cloud-based telephony service should permit code updates to occur while mitigating inconvenience to the end user.

Figure 1:
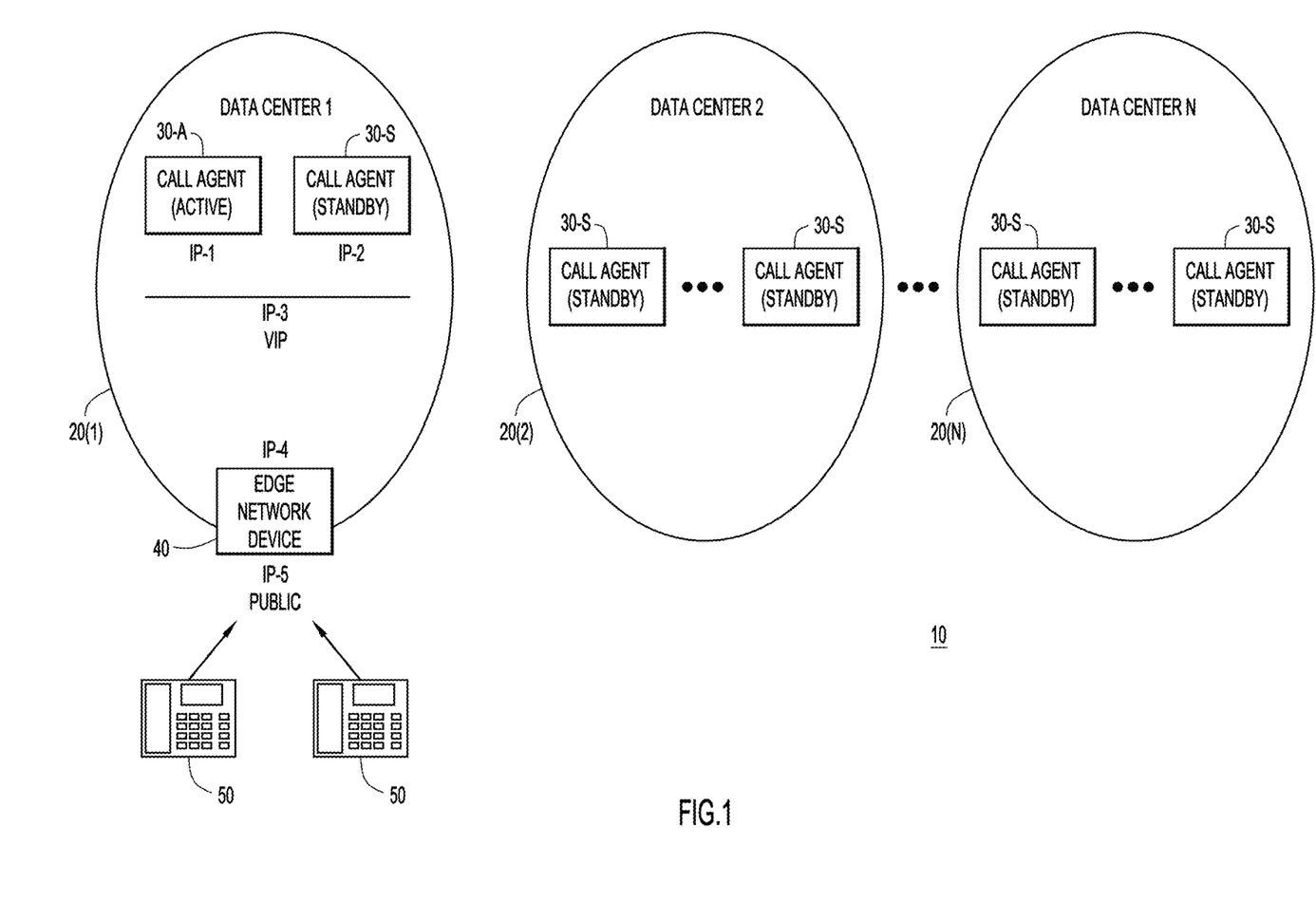
FIG. 1 is a high-level block diagram of a cloud-hosted telephony system, according to an example embodiment.

With reference made to FIG. 1, a cloud-based Internet Protocol (IP)-based telephony system 10 is shown, according to an example embodiment. The system includes at least one, but in one embodiment, multiple data centers that include call processing functionality. The system 10 provides a high availability solution so that hitless upgrade can be performed multiple times in a day. The phones and trunks should not have impact to call signaling and continue calls/features seamlessly post upgrade operation. Active calls are not impacted while an upgrade is taking place.

FIG. 1 shows that system 10 may include a plurality of data centers 20(1)-20(N). There are call agents in each of the data centers. More specifically, there is an active call agent 30-A and a standby call agent 30-S in the same data center, e.g., data center 20(1), or multiple standby call agents in other data centers. Each call agent 30-A and 30-S has its own individual or node specific (also referred to as "node instance") IP address (e.g., IP-1 and IP-2, respectively). The call agent pair nodes 30-A/30-S are on their individual IP's and servicing communication to it. The call agents form a cloud-based IP telephony service.

The active/standby call agent pair 30-A/30-S is behind a virtual IP address which provides highly available call processing services. The Virtual IP infrastructure performs an IP binding service by a daemon application, referred to as VIPD. VIPD does arbitration of the VIP address (IP-3) to the call agent node pair. In so doing, one of the call agent nodes is designated as "active" node and the other node is designated as the "standby" node. The VIPD is described in further detail with reference to FIG. 2A, below.

The active/standby call agent pair 30-A/30-S is fronted by an edge network device 40 that connects either of the active/standby call agent pair 30-A/30-S that is active to a public facing IP address, e.g., IP-5 shown in FIG. 1, to which phones 50 can connect. The phones 50 reside in the public internet interfacing to the edge network device 40 using public IP. The edge network device 40 isolates the phones 50 from connecting directly to the call agents (call processing nodes). Thus, when there is a switchover from one call agent to another, the edge network device 40 reconnects the Transmission Control Protocol (TCP) links and consequently makes it transparent to the phone that there was a switchover. It should be understood that there is an edge network device 40 in each of the data centers. The term "public" used herein is not meant to indicate that anyone in the public can determine that address, but rather that it is an IP address given to a set of call agents which perform services behind it.

Phones 50 register to the cloud-based telephone service via the edge network device 40. The phones 50 discover an available edge network device by performing a Domain Name System (DNS) lookup. The edge network device 40 handles authentication and then relays the phone registration to the active call agent 30-A that manages the subscriber. This contrasts with an on premise operation in that, whereas phones in an on premise system have a list of clustered call managers that they connect to, in a cloud-based telephone service, the phone looks for a single edge network device associated with the cloud-based telephone service.

In the cloud-based telephony service architecture depicted in FIG. 1, call agents do not operate in a clustered mode. Instead, as described above, one or more (e.g., a pair of) call agents run, one playing the role of active call agent (e.g., call agent 30-A) by actively handling phone registrations and managing calls and one acting as a hot standby call agent (e.g., call agent 30-S). While each call agent has its own individual IP address, the VIPD process binds the active call agent's individual IP address to an address to which the edge network device 40 forwards registrations and call signaling. The paradigm is that a high availability service, e.g., call agent, is fronted by a VIP address. Behind the VIP address there is one or more instance(s) of call agents, with the active instance servicing the requests. The only burden on the clients (phones, trunks, etc.) is reconnecting if the connection breaks (which they may need to do anyway, due to, for example, a network bounce or a switchover and a rebinding of the VIP address).

The transport communication to the VIP address goes to the currently active node and it services the registration and call services. The standby node is not exposed in any way to the external entities. The active and standby nodes are in communication with each other for call/registration replication. The standby node(s) connect to the active node via the VIP address, and not by way of that node's individual IP address.

FIG. 1 shows that, in one embodiment, the IP cloud-telephony service is supported by multiple data centers. In this case, call state registration and call state is replicated across multiple standby call agents, not just one standby call agents. This provides for high availability (HA) as well as a "hitless" architecture, as will become apparent from the description below.

There are several types of outages, including 1) link instability over the Internet; 2) call agent upgrade; 3) call agent outage; 4) edge network device outage; and 5) edge network device-to-call agent link instability. Call agent upgrades may happen more frequently than call agent outages.

In some cases, such as a call agent upgrade, the outage can be transient. In others, such as link instability, the outage may be more prolonged. Two variants presented herein handle both cases. The variant for dealing with a transient outage is referred to as a "hitless upgrade" and the variant for dealing with a prolonged outage is referred to as "high availability". The salient difference between the two can be summed up by the answer to the question "Did the failure result in the phone detecting the loss of registration to the cloud?" Phones detect registration loss both by running (planned) periodic REGISTER keepalives with the edge network device and REGISTER keepalives proxied by the edge network device to their call agent. When there is link stability of Internet to the edge network device, it is possible to lose REGISTER keepalives. A similar situation may occur for OPTIONs keepalives, which are used by a trunk.

As mentioned above, the on premise telephony system behavior when a phone loses its registration is non-ideal. While media continues to flow between caller and called party in good cases, without server-side call state, feature requests cannot be fulfilled. The phone disables its user interface and remains unregistered until the user hangs up, whereupon it finds the current active call manager and goes through a full reregistration.

In contrast, in a hitless upgrade transient outage or high availability prolonged outage in a cloud-based telephony system, the behavior is different. In a transient outage, the phone may in fact not detect that any problem occurred because no OPTIONS keepalives or REGISTER keepalives may have been dropped. It is also possible to consider fast TCP failure detection between the phone and the problematic edge network device or, alternatively, OPTIONs between the phone and the edge network device. The edge network device passes REGISTER keepalives through to the call agent but would respond to the OPTIONS keepalives. On the trunk side, which could be to a gateway or another call agent over SIP trunking), there are no have REGISTER keepalives, but just use OPTIONS keepalives to verify that the next hop system is up and running.

The user interface on the phones remains enabled. In a prolonged outage, however, the phone user interface does temporarily disable, but, unlike the on premise behavior, the phone continually attempts to reconnect. Upon reconnection, the call agent restores its internal call state and then, "re-stitches" the call using, for example, Session Initiation Protocol (SIP) INVITE/Replaces. The term "re-stitch" is used herein to imply a silent re-establishment or restoration of end-to-end call integrity.

While there are different external user interface effects and protocol effects for the two scenarios, the two scenarios share a lot of internal "plumbing." Both methods rely on checkpointing some key data (but by no means full call data—this would be unfeasible in a call agent due to the large amounts of tracked information) into a persistent store. This key data that is checkpointed is not sufficient to instantiate all objects directly in a standby call agent, but it is sufficient for the standby call agent to resynthesize a facsimile of the original call.

Figure 2A:
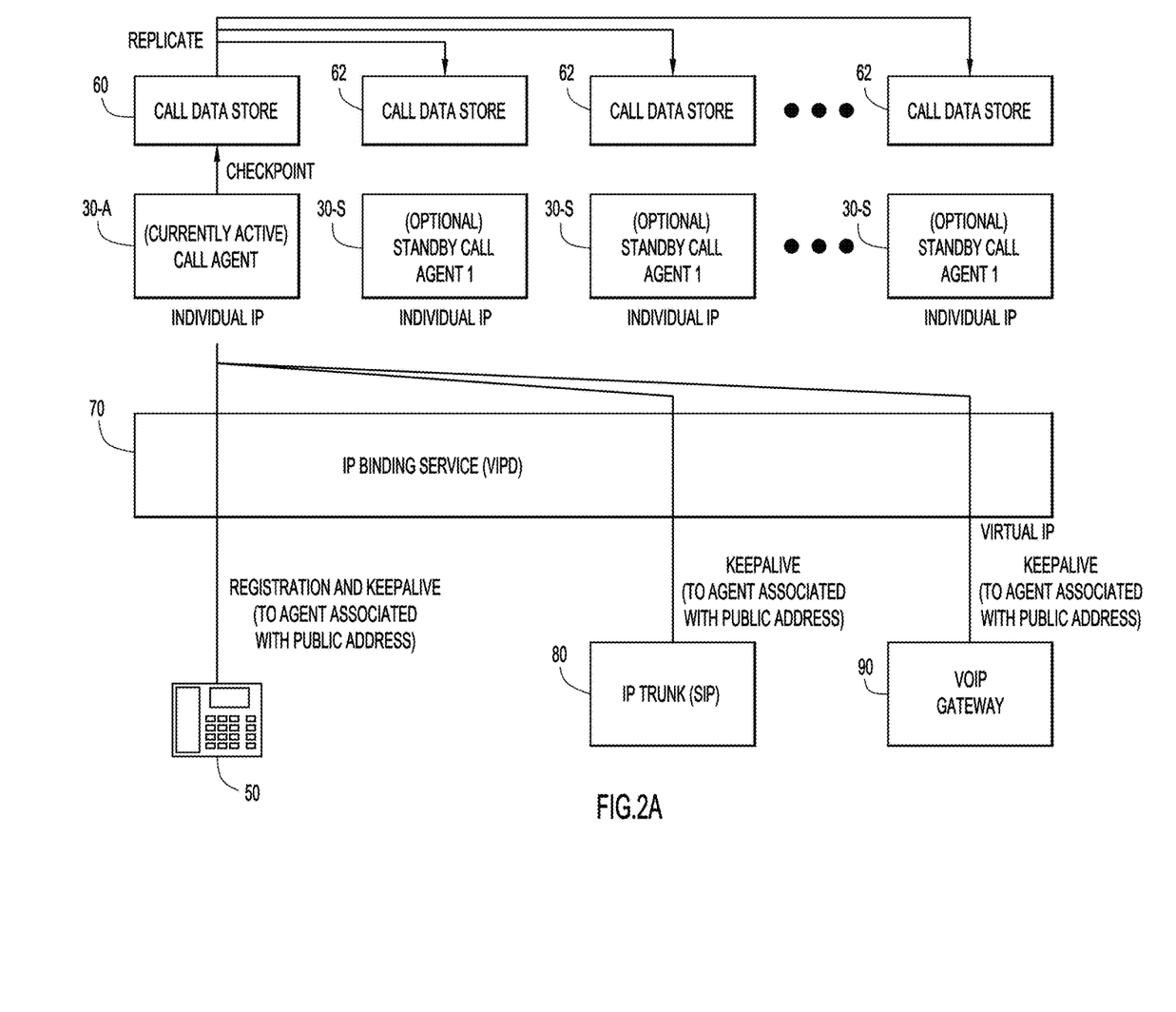
FIG. 2A is a more detailed diagram of the cloud-hosted telephony system featuring an active call agent and one or more standby call agents, according to an example embodiment.

To this end, reference is now made to FIG. 2A. FIG. 2A shows the basic operations that occur when a call is being serviced by an active call agent. Associated with each call agent is a call data store, which is memory allocated to store data associated with a call. Thus, active call agent 30-A has a call data store 60, and each standby call agent 30-S has a call data store 62. When a call is set up and established, registration and keepalive messages are directed to the call agent associated with the public address, and the IP binding service (VIPD) 70 directs the messages to the active call agent, as shown in FIG. 2A. This includes messages from a phone 50 as well as messages from a SIP IP trunk 80 and a voice-over-IP (VoIP) gateway 90. The call agent's private IP address exists independent of the VIP address, which is important because when an individual call agent is being upgraded, it is being done via the individual call agent's IP address.

Although FIG. 2A shows the VIPD 70 as a single entity spanning multiple nodes, it is embodied as software running on each call agent node. The set of VIPD services running on the call agent nodes arbitrate amongst themselves to determine which node will have the VIP. That node is designated as "active" and the other(s) as "standby." The active call agent 30-A will be active from VIP's perspective and the standby call agent 30-S will normally be in maintenance mode. Each standby call agent 30-S would be ready to take over the VIP once active fails or put into maintenance mode. Thus, the VIPD software agents shuffle the VIP address from one call agent to another. The call agent with the VIP address is the "active" node. To this end, as shown in FIG. 2A, the contents of the call data store 60 associated with the active call agent 30-A is replicated to the call data stores 62 for each of the standby call agents 30-S. By replicating the call data store 60 of the active call agent to the call data store 62 of each of the one or more standby call agents, the relevant information during different stages of a call is checkpointed to the standby call agents. Specifically, the checkpoint information would constitute all the external interface related data from the call agent (e.g., towards phone or trunk, the SIP dialog and media negotiation).

As shown in FIG. 2A, there are several different memories (storing text that is descriptive of calls) that can be interpreted or re-switched either immediately or at a later time after switchover. Information may be trickled to the standby, or all the information can be committed to a call data store, and when needed, it can be retrieved all at once to re-build a call. In one embodiment, the standby call agents receive no notification of replicated records. A standby call agent is notified that it is the new active call agent and it has to request all current stable records in bulk and then start the simulator recovery process (described below) for all those calls.

With the call data store replication function (described in more detail below), there is a change notification. There is still a bulk recovery performed, but notifications are used as a way to have the standby call agents 'pre-recover' using the simulator process. Therefore, trickle activity is more a function of the standby call agent(s) than the current active call agent.

Figure 2B:
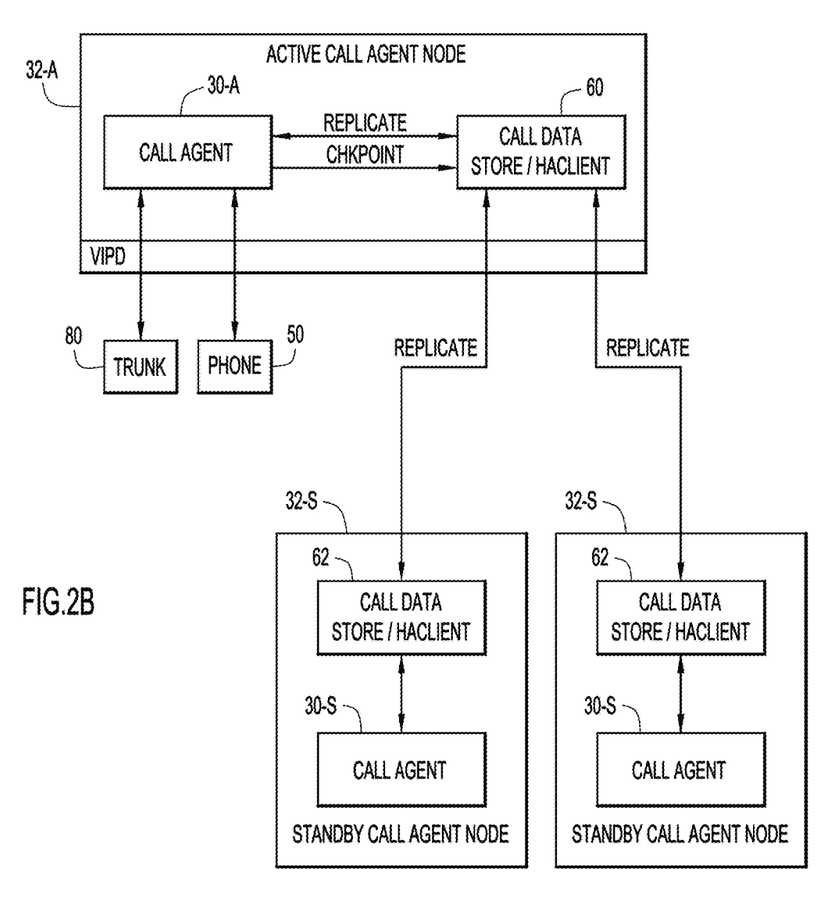
FIG. 2B is another more detailed diagram illustrating the call data store replication functionality, according to an example embodiment.

Turning to FIG. 2B, as phones successfully register to the currently active call agent, the registration data is checkpointed into the call data store 60 associated with the active call agent 30-A in the active call agent node 32-A. The call data store 60 is also referred to as a high availability client (HAClient). On the active call agent node 32-A, the active call data store/HAClient 60 has all of the checkpoint data, and may be referred to as an HAServer. The standby call agent nodes 32-S each have a similar call data store/HAClient function 62 as depicted in FIG. 2B, associated with a corresponding standby call agent 30-S. The call data stores/HAClients 62 associated with the standby call agent nodes 30-S all connect to the active call data store/HAClient 60 through the VIPD function 70 running on the active call agent node 32-A.

As explained in connection with FIG. 2A, each call data store/HAClient 62 gets a copy of the checkpointed data in call data store/HAClient 60 via replication. As phones register/deregister on the active call agent 30-A, through the replication process, the standby call agent(s) 30-S maintains the real-time state of the phone registration status of the active call agent 30-A. As explained above, in one embodiment, there is a strict pair of data stores (one for the active call agent and one for the standby call agent) but in a multiple data center embodiment, there are multiple standby call agents and consequently multiple replicated data stores. As calls are placed through the currently active call agent, the active call agent 30-A checkpoints key data relating to stable calls to the call data store/HAClient 60, which replicates to the call data store(s)/HAClient(s) 62 for the standby call agent(s).

The VIPD function 70 is in charge of determining which node is active. When a switchover occurs, for example, from active to standby, then in one embodiment, the new standby HAClient discards its checkpointed data and both it and call agent restart. The newly active node now contains the only checkpointed data, which is then replicated to all the other nodes. In the case of more than two nodes, the other standby nodes would become synchronized to the active node by the replication mechanism. The synchronization mechanism may use resynchronization techniques now known or hereinafter developed, such as a "cold start" method of receiving all the data and then keeping synchronized through the change-notifications.

In the multiple data center embodiment depicted in FIG. 1, tracking objects may be used to keep track of which call agents are active and standby across data centers. The standby call agent that is promoted to active status does not need to be in the same data center as the active call agent. More than two VIPD functions may be supported. In one embodiment, the Border Gateway Protocol (BGP) or other protocols may be used to signal to which node the VIP address is bound to extend a local subnet across the data centers.

Selection of which standby node to become active may involve selecting whichever standby node has the highest priority at the time that the active node reduces its priority. The priority reduction of the active node can occur because it is administratively demoted or because the VIPD function associated with the active call agent detected that the active call agent has failed. The priorities determine which standby node is promoted to active status and the VIPD mechanism ensure that notification is made to all the call agent nodes so that each knows the priority of it and all the other call agent nodes.

In more detail, the VIPD's prime function is to bind an individual IP address to a "public"-facing address. When all the servers are on one private subnet, the VIPD can "listen" to address traffic on the wire. The VIPD can then be configured to watch for specific interfaces that it monitors. For this to work across data centers, which are composed of different subnets practically by definition, a mechanism is needed to bridge the link traffic from one subnet to the other so that the various VIPDs can monitor the traffic and coordinate on selecting an active system. This can be done at the IP routing layer using BGP options as indicated above. In this case, though, the promotion of a standby node is handled entirely by the VIPD. Among the candidate standbys, one becomes master. I expect there are nuances here and it's important to note that we haven't done a detailed design on this.

As explained above, in most scenarios, different data center will be in different subnets. In this case, two independent VIPDs may be running with active call agents and standby call agents in each data center. Everything is likely running in the primary data center and upgrades/call agent outages cause the VIPD in that data center to promote a standby call agent in the same data center. However, that data center could go down. The phone will not be able to register at all. In this case, if the phone had a backup public address to register to (the VIPD in the other data center), it could connect there to the "active" call agent in that data center.

Figure 3:
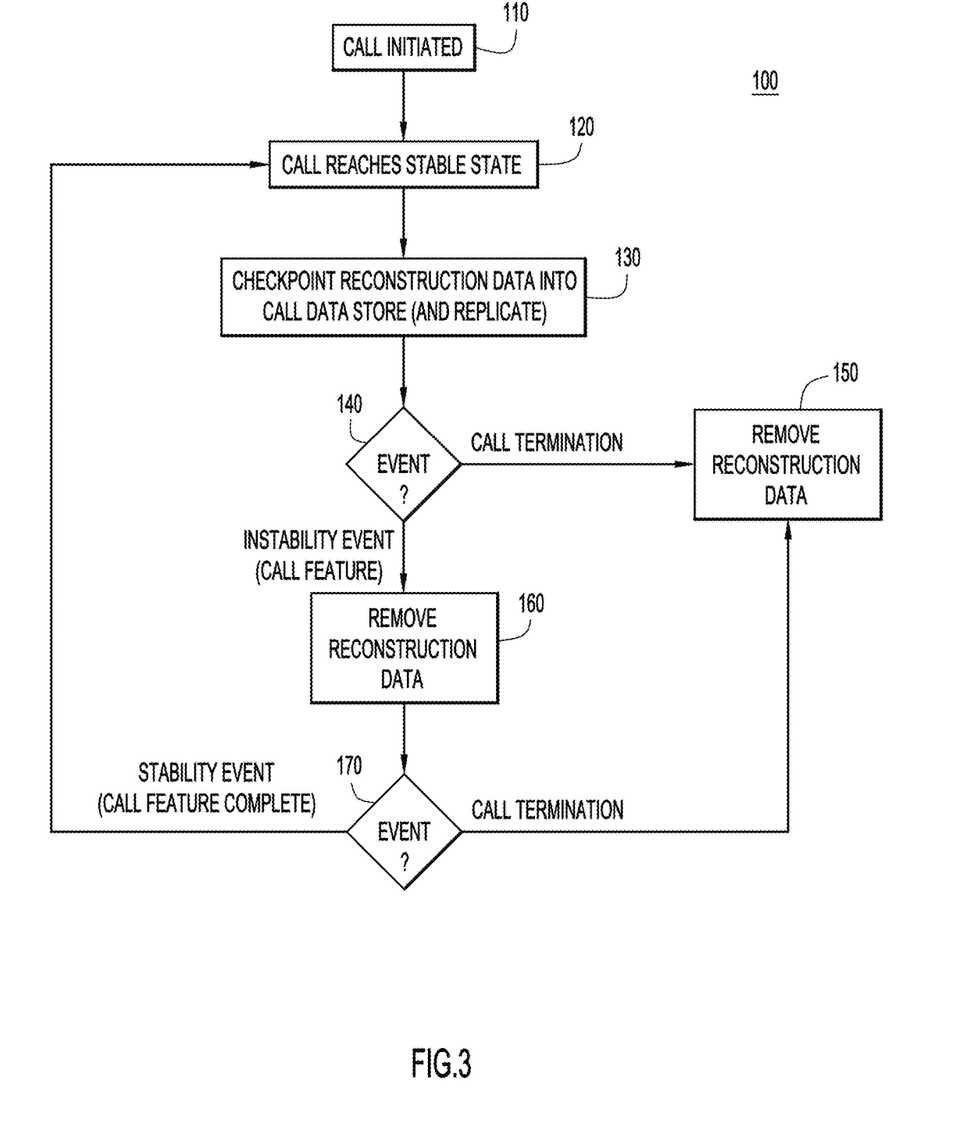
FIG. 3 is a flow chart depicting operations for basic management of a call, according to an example embodiment.

Reference is now made to FIG. 3, with continued reference to FIG. 2A. FIG. 3 shows a flow chart for a method 100 of operations associated with a call being established at an active call agent. At step 110, a call is initiated. At 120, the call eventually reaches a stable state 120 on the active call agent. At 130, the active call agent checkpoints call reconstruction data into its call data store and that call reconstruction data is replicated to the call data stores of the one or more standby call agents. Specifically, the checkpoint information may include all the external interface related data from the call agent (e.g., towards the IP Phone or Trunk, the SIP dialog and media negotiation). When an event occurs, at 140, the subsequent steps that occur depend on the nature of the event. If the event is a call termination event (e.g., the parties to the call terminate the call), then at 150, the active call agent removes the reconstruction data from its call data store for that call, as well as from the call data stores of the one or more standby call agents. If the event is an instability event, such as a call feature, then at 160, the reconstruction data can be removed from the data store.

At 170, another event occurs. If the event is a call termination event, then step 150 is performed. If the event is a call stability event (i.e., a call feature is complete), then the method returns to step 120.

The checkpoint data or information (the aforementioned call reconstruction data) constitutes fields of data considered important at a standby call agent from the perspective of recovery operation. During the life of a call, the state of the call changes and also a connected party can change, so checkpoint data is incrementally updated as and when it is changed at source. For example, on a call agent, every 2-party call has two sides named as side1 and side2. The checkpoint data may be logically divided into common, side1 and side2 specific data.

The common data may include information such as: call state, a flag indicating if a media resource is allocated, SIP dialog tabs with the media leg, session description protocol (SDP) related data, record update epoch. Examples of checkpointed data that is specific to a side of the call may include: node identifier of the server, name of the device provisioned into the database, flag indicating whether the side is holding the call, Pkid (for phones, Pkid of LineControl and for trunks, Pkid of SIP trunk), SIP dialog information, SIP dialog call identifier, record route, session identifier, SIP Cseq value that was last sent in a SIP transaction out from the call agent (during recover this information is used by the standby agent in forming the Cseq for outgoing SIP transactions, for example, by adding +10 to checkpointed Cseq to account for any missed checkpoints), and dialog direction.

Figure 4:
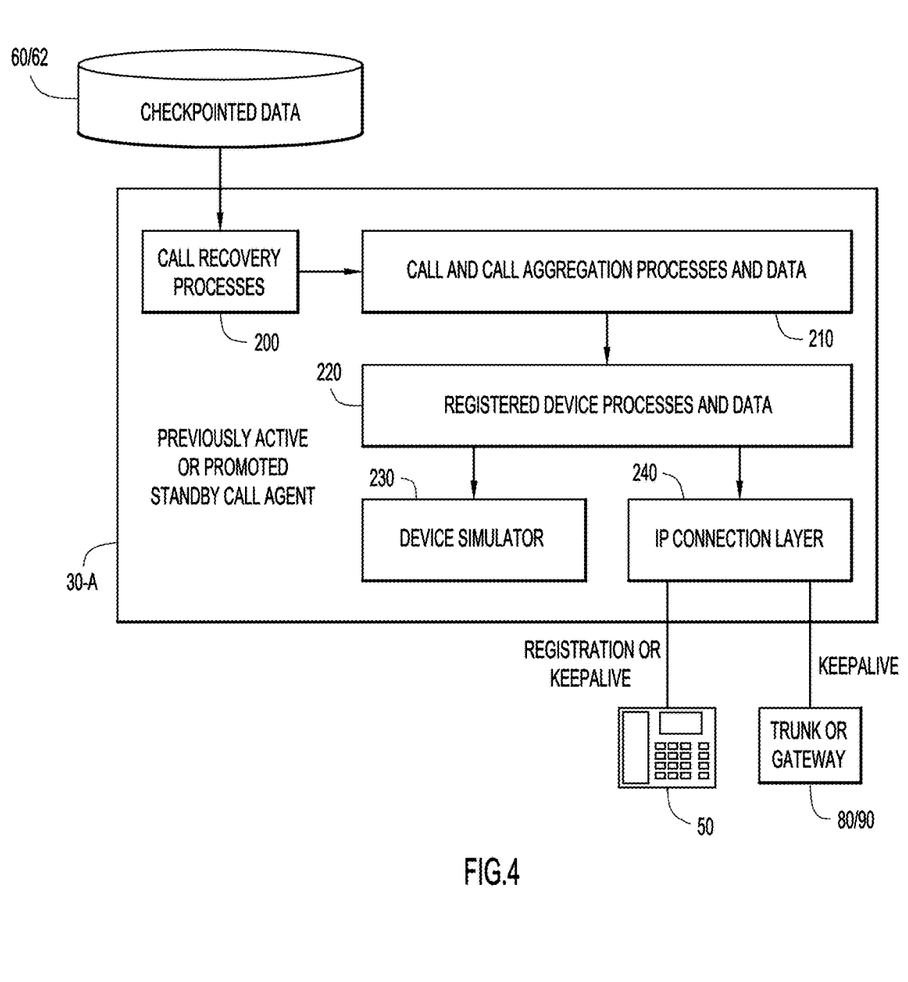
FIG. 4 is a functional block diagram of an active call agent, according to an example embodiment.

Reference is now made to FIG. 4. In FIG. 4, more details are shown of a previously active call agent or a standby call agent that has been promoted to active status. For simplicity, this call agent is referred to as active call agent 30-A, and again this could be a call agent that was just promoted to active status. The call agent 30-A obtains checkpointed data stored in the call data store 60 or 62. The active call agent 30-A includes call recovery processes 200, call and call aggregation processes and data shown at reference numeral 210, registered device processes and data 220, a device simulator process 230 and an IP connection layer 240.

The call recovery processes 200 include processes for:
Active Role (Consolidate & Initiate checkpointing)
Standby Role (Receive and store checkpointing)
Handle switchover from Standby to Active role.
Drive Recovery (re-stitching) by processing checkpointed data.

For each recovery, the call recovery processes 200 handle status of re-stitching and generate appropriate events (success, failure, errors etc.), and determine when re-stitching is complete and communicate it to concerned modules/processes, e.g., the call and call aggregation processes and data 210.

The call and call aggregation processes and data 210 handles data associated with calls that have been served by the call agent. The registered device processes and data 220 handles processing of messages for registered devices involved in calls handled by the call manager. The IP connection layer 240 receives registration or keepalive messages from IP phones and IP trunk 80 or gateway 90.

A call agent performs functions similar to those performed by a traditional telephone network operator. It receives the initial call request, looks up the destination and then initiates an 'independent' session to the target user's device. Upon answer by the target user's device, the call agent 'patches' the parties together.

There are two basic types of virtual or physical processes. One is specific to the devices served by the call agent. That is, the call agent maintains link/registration state to the devices it serves in order to understand that the party in question is physically there and prepared to accept incoming calls. This process is protocol-specific. To a SIP device, it tracks a SIP-specific state machine and processes messages formatted according to SIP. To a device that operates in accordance with the H.323 audio/visual communication session standard, it tracks an H.323 specific state machine and processes messages formatted according to the H.323 standard.

SIP and H.323 are protocols designed to serve the purpose of establishing real-time sessions between participants. Although the details differ, the steps involved are very similar. A user goes offhook, provides address digits, digits are used to select a destination, the call originator receives a ringback, the call destination is offered the call and starts alerting, the call destination answers, ringing and ringback is stopped, and an end-to-end connection is brokered. As such, these protocols can generally be mapped to a common set of primitives that abstract away the protocol details and instead deal more with the actions that the call agent needs to perform in order to establish the session.

This is the distinction between the call and call aggregation processes and data 210 and the registered device processes and data 220. The former is the abstracted signaling used by the call agent to establish a session between two parties and the latter is the protocol-oriented state that is also aware of an actively connected endpoint.

The call aggregation aspect is now further described. In enterprise telephony, sessions are established not solely between individual endpoints, but sometimes between groups of endpoints. An offered call may ring 5 devices that share a line, or a hunt list might ring 15 devices serially looking for someone to take a call. The call agent, however, is primarily focused on establishing a two-party connection, though, so the function of the aggregation processes is to map the signaling generated by a plurality of endpoints into a set of signals that, to the call agent, looks a lot like a simple two-party call. The aggregation function in FIG. 4 contains the route list, line appearance, and hunt list.

To summarize, call agents in general will have generalized functions that handle the roles of connectivity to specific devices and the ability to broker connections between them.

A goal of the embodiments presented herein is to restore a call agent with the same state as it was on active call agent. This includes all the state machines in the call arc of a call agent, including the SIP stack. The data to drive this recovery comes from the checkpointed information. The call agent performs recovery on its own without communicating on socket connection of SIP trunk or Line to avoid interference with recent state in a remote SIP user agent. To this end, the device simulator 230 acts as a responder to any session communications (e.g., SIP communications) coming to the call agent. It accesses the checkpoint information as requested to use in forming request/response messages. In some cases the device simulator 230 would initiate requests as well. In other words, the device simulator assists by acting as a phone or trunk, as necessary, to mimic a device participating in a call that was being handled by the call agent prior to a loss event.

The call agent performs recovery silently using the device simulator 230. More specifically, and as described in more detail below, address switchover happens so fast that the keepalive messages between the phones and the call agent do not expire, and the phones never really lose service. For extended outages, when it may take longer for standby call agent to take over, there may be some time outs, in which a call preservation mode is invoked. In that mode, streaming media is maintained, but because there is no call state on the call agent side, certain functions cannot be invoked.

Thus, in one embodiment, active/standby architecture recovers differently depending on whether or not the phones themselves have lost their connection. If they have not lost their connection, then switchover is made and the call state is recovered on the server side on the standby call agent. If they phones have lost their connections, the call information stored in the replicated call data store is used, but an invite/replace mechanism may be used to get the phones re-registered and the server side state restored. In one form, the standby call agents are not needed and it is possible to do all of call recovery with the call data store associated with the active call agent when the active call agent comes back up.

For hitless upgrade, when an upgrade occurs, the following steps occur:

The standby call agent is upgraded first to reduce the number of switchovers. After upgrade is successful, a wait is performed for the standby call agent to become ready to take over the active call agent's role.

Next, the deployment then proceeds to the currently active call agent, where the active call agent is forced to standby and the standby call agent becomes active through one of several means, by demoting the active call agent via the VIPD, terminating the active call agent process, and so forth. The VIP address is then bound to the standby call agent making it active.

On the newly active call agent, the following steps occur. The hitless upgrade process within the call agent uses checkpointed data to extend calls towards affected phones in a call arc "re-stitching" procedure. In a hitless upgrade scenario, as opposed to a high availability scenario, no signaling would actually be placed on the wire, because of the use of the aforementioned simulator process.

The simulator process within the call agent intercepts and responds to these calls until both call legs for the affected phones have been connected. This occurs without any network traffic. When the call legs have been connected, the simulation for that call ends. At any time, any incoming network traffic for the re-stitching the call takes precedence over this and other simulations, allowing changes in call state to proceed seamlessly. The user may never detect any outage due to switchover.

Once all active phone calls have been reconnected, the active call agent continues to handle normal call processing tasks. In the meantime, the new standby call agent is upgraded.

The following is the process for the high availability scenarios. The initial condition is different as some failure has occurred. This could be one of the following: 1) the active call agent has crashed and the standby detects the crash; 2) all call agents have crashed; 3) an edge network device has crashed; 4) a long link outage for all phones or a subset of phones has occurred. Important here is that in all these cases, one or more phones has gone into a hard preservation mode. The call agent has cleaned up all active internal processes related to the call but without propagating any clearing messages on the end-to-end call (since if one phone goes out and the other survives, sending clearing messages to that phone would irrecoverably terminate the call). This behavior is termed "quiet clear". At this point, the phone is unregistered, it is aware it is unregistered it, it is preserving media, the phones user interface is disabled, and the phone is trying to phone home, i.e., register with the call agent.

Next, the system is re-stabilizing. Unlike hitless upgrade, where the outage is orchestrated, there are various paths corresponding to the above outage scenarios, as follows: 1) the standby call agent detects the loss of the active call agent and promotes itself to active; 2) the loss of the services is detected and the call agents are restarted (and the original active call agent tries to take back control over its original calls); 3) the phones give up on their original edge network device and find a new edge network device, reregistering; and 4) the link outage clears and the phone is able to reconnect. The server side has checkpointed state in a persistent store, has quiet-cleared the affected calls, and now needs to restore the calls that it can.

When both phones affected by the outage reach a re-registered state in this high availability scenario, the high availability management subsystem kicks in, just as in hitless upgrade. The system is resynthesizing a point-to-point call within the call agent by extending calls towards the affected endpoints.

Just as in the hitless upgrade scenario, the simulator process responds on behalf of those phones to get the call arc established.

Whereas in hitless upgrade, the phone never detected any outage, in high availability, the phone has taken any active calls and zombified them. For the calls to revive, the aforementioned INVITE/REPLACES mechanism kicks in. Continued call processing can now resume.

In a slightly different embodiment for both hitless upgrade and high availability, the system would accomplish most call arc restoration before the VIPD rebinds the addresses, similar to what is done with phone registrations. This is referred to as "trickle" recovery.

The operations referred to above in a failure or upgrade are now described with reference to FIGS. 5 and 6.

Figure 5:
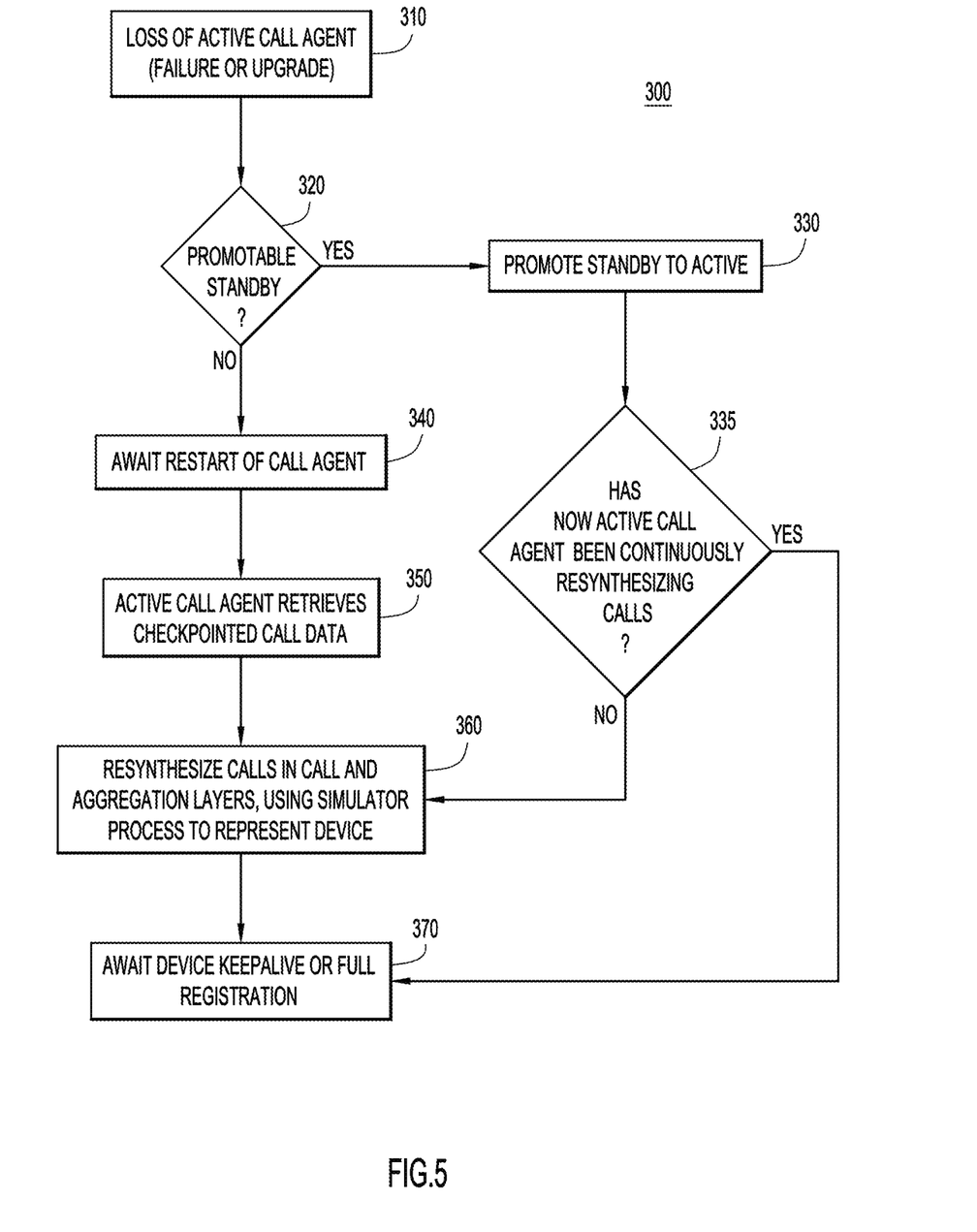
FIG. 5 is a flow chart depicting operations initially performed after a loss occurs at the active call agent, according to an example embodiment.

Reference is now made to FIG. 5. FIG. 5 shows a flow chart for a process 500 that occurs when there is a loss (e.g., a failure or upgrade) of an active call agent. At step 310, a loss occurs at an active call agent. This may be due to a failure even or an upgrade event. At 320, it is determined whether there is a promotable standby call agent available. If there is a promotable standby call agent, then at 330, the standby call agent is promoted to active status. On the other hand, if there is no promotable standby call agent available, then at 340, a wait period is entered for the active call agent to restart. After the active call agent starts, then at 350, the active call agent retrieves the checkpointed call data (which it had been saving to the call data store as described above in connection with FIGS. 2A and 3). At 360, the active call agent resynthesizes the calls in the call and aggregation layers, using the device simulator to represent a phone or trunk, as described above. At 370, the call agent awaits device keepalive messages or full registration messages from a phone or trunk for the calls that were resynthesized.

On the other hand, if the path to step 330 is taken, then at 335, it is determined whether the now active call agent has been continuously resynthesizing calls. If it has not then, processing goes to step 360 to resynthesize the calls. If it is determined at 335 that the now active call agent has been continuously resynthesizing calls, then processing goes to step 370.

Figure 6:
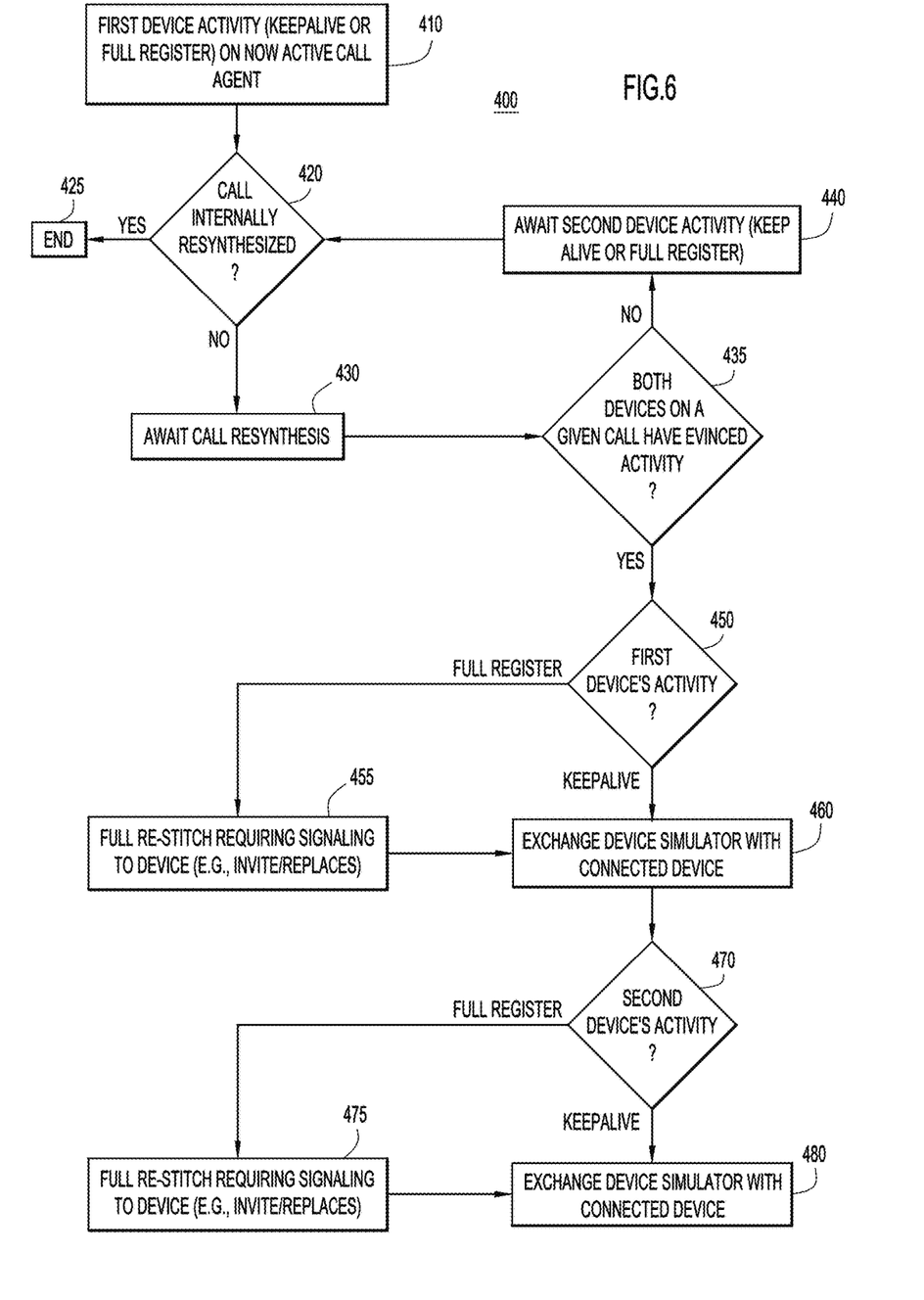
FIG. 6 is a flow chart depicting operations performed to resynthesize calls that were impacted during a loss at the active call agent, according to an example embodiment.

Reference is now made to FIG. 6. FIG. 6 illustrates a flow chart for a process 400 when keeplive or registration messages are received for the devices that were involved in the calls during the loss event. Thus, FIG. 6 illustrates processing that occurs when keeplive or full registration messages are received from devices that were participating in a call.

At 410, activity for a first device (in a call) is evident on the now active call agent, by virtue of keepalive or full registration messages received at the call agent. At 420, it is determined whether the call involving the first device has (already) been internally resynthesized by the call agent. If the call has been resynthesized, then the process 400 ends at 425. If the call has not been internally resynthesized, then the call agent waits until the call has been resynthesized for the first device. At 435, it is determined whether both devices on the given call to be resynthesized have evinced activity. If it is determined at 435 that both devices on the given call have not evinced activity, then at 440 the call agent awaits activity from the second device (e.g., keepalive or full registration messages). At 450, the activity from the first device is evaluated. If the first device has been sending keepalive messages, then the process goes to 460 where the call agent exchanges the device simulator (that was activing as the first device for purposes of resynthesizing the call involving the first device) with the now connected device, i.e., the first device.

On the other hand, if the first device has been sending full registration messages, then at 455, the call agent does a full re-stitch or re-establishment of the call, in which signaling to the first device is employed (e.g., INVITE/REPLACES signaling), and after that, proceeds to step 460.

After step 460, the call agent evaluates the activity of the second device in the call, and either performs step 475 and then step 480 if the second device is sending full registration messages, or performs just step 480 if the second device is sending keepalive messages.

Thus, in steps 450 and 470, if keepalives are being received from an endpoint, it is not necessary to send any signaling to the endpoint to re-establish the call to the state prior to the outage. On the other hand, if an endpoint is attempting full registration (and not sending keepalives), then at 455 and 475, it is necessary to send signaling toward the endpoint to re-establish the call to the state prior to the outage.

The aforementioned call re-stitching operations using SIP INVITE/REPLACES features, is now briefly described.

When performing a full re-stitching of a call (e.g., in operations 455 and 475 of FIG. 6), to initiate a communication dialog between endpoints, the active call agent can send an invitation message to both endpoints of the call that invites each endpoint to utilize a communication dialog facilitated by active call agent. These operations use the SIP INVITE/REPLACES functionality defined in IETF RFC 3891 (where the mechanism was designed for handling call transfers) The invitation message can provide each endpoint with necessary data to initiate the communication dialog, such as an identifier identifying the communication dialog, data identifying active call agent, data identifying the type of data to be exchanged, features to be provided, etc. For example, the invitation message can be a SIP INVITE request that provides an endpoint with the option of connecting to a requesting node by using the data provided in the INVITE request.

In addition, a SIP message that utilizes the REPLACES header may be used. SIP may utilize headers to provide network traffic guidance for a communications system. An example of a SIP header is a REPLACES header. The REPLACES header can replace an existing SIP dialog with a different SIP dialog. An example use of the REPLACES header is to replace one participant with another in a multimedia conversation. The REPLACES header can also facilitate supplementary telephony services such as call hold, call transfer, call park, retrieve from park, transfer from park, call resume, transition from locally mixed conferences to two party calls, and the like. In some embodiments, there may be no influence by the REPLACES header on voice/data communication.

Furthermore, the REPLACES header may contain information used to match an existing SIP dialog, for example, call ID, to-tag, and from-tag, wherein call ID may be a unique identifier for a call or caller, the to-tag may be a desired destination for a call, and the from-tag may be a sender or location of the point of origin of a communication of the SIP dialog. In some embodiments, the REPLACES header can be used in conjunction with an INVITE request to facilitate replacement of an existing SIP dialog with a different SIP dialog. An INVITE request may provide a node of the communications system with the option of connecting to a requesting node by using the data provided in the INVITE request.

The basic idea of RFC 3891 is as follows. In SIP, sessions between two endpoints are identified by an identifier called a dialog-ID, which consists of three elements: a value generated by the caller, called a From-Tag, another value generated by the caller, called the Call-ID, and a value generated by the peer, called a To-Tag. For any point-to-point session, once these are established, they are immutable.

In RFC 3891, a call transfer may consist of an existing session (with dialog ID d1) between a primary party and a transferring party and, a completely independent consultation session (with dialog ID d2) between the transferring party and a consultation party. Upon execution of the transfer, the transferring party issues a REFER message to the primary party and specifies the address of the consultation party. This REFER message causes the primary party to issue an INVITE message on a new dialog (d3) to the consultation party. Without any additional processing, the consultation party would have no way to determine that the incoming INVITE was anything but a new incoming call, and it would alert the target user (alternatively, forward the call). By embedding a REPLACES (d2) header, this indicates to the consultation party that the incoming INVITE should supplant the already-existing session on the endpoint.

In the context of a session recovery from the call agent to a phone that has gone into hard preservation, the newly active call agent needs to originate signaling to the phone that is in a preservation state, with the goal of recovering the initial session. This is achieved by issuing a new INVITE which, perforce, will in all likelihood have a new dialog ID. Therefore, to have the phone supplant the original session with the newly offered one, the newly active call agent relies on the REPLACES header to usurp the previous session.

Thus, the SIP INVITE/REPLACES features can be used to reach out to the two endpoints that were participating in a call and "re-stitch" or re-establish the call with the endpoints back to its prior state before the loss event. In the context of the process shown in FIG. 6, following the full re-stitch/re-establishment of the call, then the context maintained by the device simulator process is used, thereby exchanging out the device simulator for the actually connected endpoint/device that was part of the re-stitch process in steps 455 and/or 475.

To reiterate, for simulator-based re-stitching in which the call is rebuilt before the phone loses its keepalives, the VIPD function has rebound to the IP address before the phone recognizes anything has happened. For full re-stitching, where the phone has lost its registration and the INVITE/REPLACES function is initiated, from the standpoint of the phone, it has just been attempting to connect to the same IP address and the VIPD function has bound that address to an alternate too slowly.

This becomes more relevant in multiple data center embodiment described above, where there are three alternatives: 1) the VIPD function can span multiple data centers with different IP addresses, 2) a multiple data center IP address sharing occurs but only on some individual IP address space, so that a single edge network device uses an Internet address and it relays the signaling to the advertised address for the call agent, and 3) the phone is actually aware of multiple candidates. For example, phone 1/switch 1 (P1/S1) may be behind a first edge network device (E1) and phone 2/switch 2 (S2/S2) behind an edge network device (E2) in another data center. If the phone 1 has a continued outage on edge network device E1, it might attempt to then contact edge network device E2 under the assumption that the first data center is down. The VIPD function may tie the IP address to the active address of the call agent and either the phones recovered fast enough that they do not need any signaling to recover the call or slow enough that some degree of the INVITE/REPLACES mechanism is needed.

Figure 7:
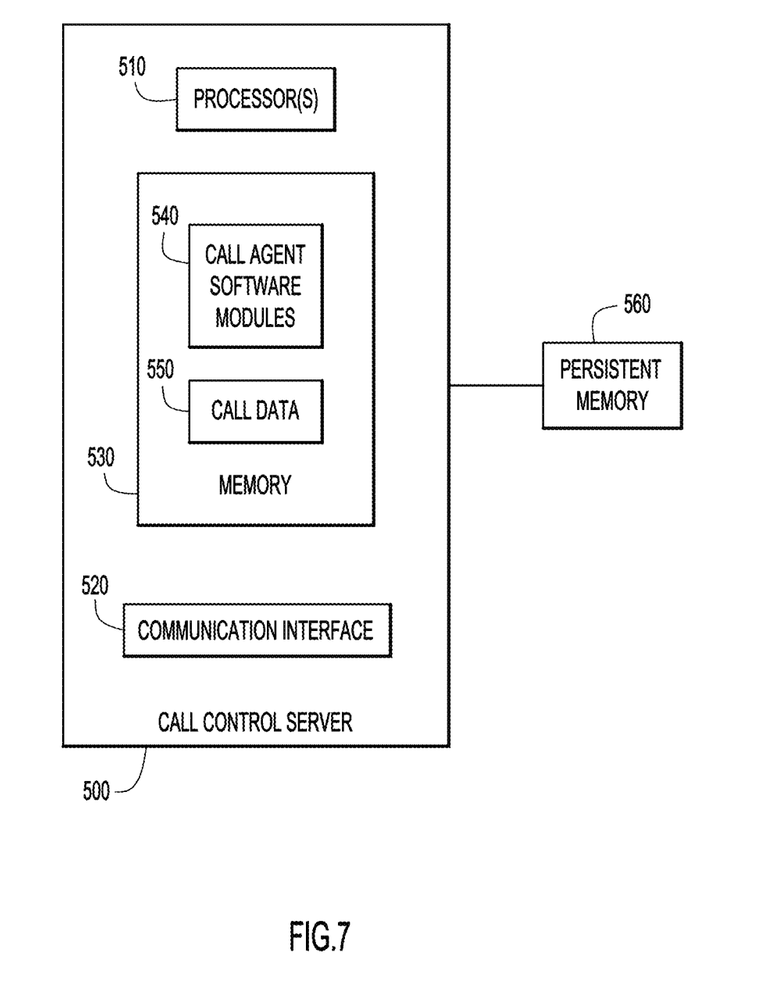
FIG. 7 is a block diagram of a call control server configured to perform operations of the call agent, according to an example embodiment.

FIG. 7 illustrates a block diagram of a call control server that performs the various call agent related functions described above in connection with FIGS. 1-6. The call control server, shown at reference numeral 500, includes one or more processors 510, a communication interface 520, memory 530 and a persistent memory 560. The one or more processors 510 may be one or more microprocessors. The communication interface 520 may consist of one or more network interface cards that enable network connectivity on behalf of the call control server 500. The memory 530 stores instructions, executable by the one or more processors 510, for call agent software modules 540. When the instructions of call agent software modules 540 are executed by the one or more processors 510, the call agent operations described above are performed. Call data 550 associated with one or more calls managed by the call control server 500 are stored in memory 530, from which checkpointed information is stored into the persistent memory 560 (for the aforementioned call data store/HAClient functions 60/62). It is also to be understood that FIG. 7 is representative of each of the servers in the multi-data centers 20(1)-20(N) that include the call agent functionality described herein, as shown in FIG. 1.

The memory 530 may be read only memory (ROM), random access memory (RAM), magnetic disk storage media devices, optical storage media devices, flash memory devices, electrical, optical, or other physical/tangible memory storage devices. Thus, in general, the memory 530 may comprise one or more tangible (non-transitory) computer readable storage media (e.g., a memory device) encoded with software comprising computer executable instructions and when the software is executed (by the one or more processors 510) it is operable to perform the operations described herein.

In summary, the processes presented herein isolate the call re-stitching process from external entities. For instance, the call control functionality is abstracted from the phones/endpoints devices, and line side call control is abstracted from trunk side call control.

In one form, a method is provided comprising: a call agent process running on a server to support one or more Internet Protocol (IP) calls, storing to persistent memory a set of data associated with the one or more IP calls; detecting an outage affecting the one or more IP calls; using the data retrieved from the persistent memory, resynthesizing the one or more IP calls using a device simulator process to simulate connectivity with endpoints that were participating in the one or more IP calls prior to the outage; and after resynthesizing, depending on activity detected from devices associated with the one or more IP calls: internally re-establishing the one or more IP calls with the endpoints involved in the one or more IP calls; or fully re-establishing the one or more IP calls by signaling an endpoint that was participating in the one or more IP calls.

In another form, an apparatus is provided comprising: a communication interface; a memory storing instructions for a call agent process to support one or more Internet Protocol (IP) calls; a persistent memory; and a processor coupled to the communication interface and the memory and the persistent memory, the processor configured to: store to persistent memory a set of data associated with the one or more IP calls supported by the call agent process; detect an outage affecting the one or more IP calls; using the data retrieved from the persistent memory, resynthesize the one or more IP calls using a device simulator process to simulate connectivity with endpoints that were participating in the one or more IP calls prior to the outage; and after resynthesizing, depending on activity detected from devices associated with the one or more IP calls: internally re-establish the one or more IP calls with the endpoints involved in the one or more IP calls; or fully re-establish the one or more IP calls by signaling an endpoint that was participating in the one or more IP calls. In still another form, a system may be provided that comprises the apparatus, and wherein the call agent process is an active call agent process, and the system further including a plurality of standby call agent processes running on respective servers, wherein the processor is configured to replicate the set of data associated with the one or more IP calls to persistent memory for each of the plurality standby call agent processes; and wherein upon detecting the outage, one of the plurality of standby call agent processes is a promoted active call agent process, and wherein the resynthesize, internally re-establish or fully re-establish operations are performed by the promoted active call agent process.

In another form, one or more non-transitory computer readable storage media encoded with instructions that, when executed by a processor, cause the processor to perform operations comprising: at a call agent process running on a server to support one or more Internet Protocol (IP) calls, storing to persistent memory a set of data associated with the one or more IP calls; detecting an outage affecting the one or more IP calls; using the data retrieved from the persistent memory, resynthesizing the one or more IP calls using a device simulator process to simulate connectivity with endpoints that were participating in the one or more IP calls prior to the outage; and after resynthesizing, depending on activity detected from devices associated with the one or more IP calls: internally re-establishing the one or more IP calls with the endpoints involved in the one or more IP calls; or fully re-establishing the one or more IP calls by signaling an endpoint that was participating in the one or more IP calls.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a call agent process running on a server to support one or more Internet Protocol (IP) calls between a plurality of endpoints, storing to persistent memory a set of data associated with the one or more IP calls;
   detecting an outage affecting the one or more IP calls;
   using the data associated with the one or more IP calls retrieved from the persistent memory, resynthesizing the one or more IP calls using a device simulator process at the server to simulate connectivity with the plurality of endpoints that were participating in the one or more IP calls supported by the call agent process prior to the outage without communicating over a socket connection; and
   after resynthesizing, re-establishing the one or more IP calls with the plurality of endpoints depending on activity detected from devices associated with the one or more IP calls, including:
      upon detecting a first type of activity from the devices associated with the one or more IP calls, internally re-establishing the one or more IP calls with the plurality of endpoints involved in the one or more IP calls without signaling an endpoint that was participating in the one or more IP calls; and
      upon detecting a second type of activity from the devices associated with the one or more IP calls, fully re-establishing the one or more IP calls by signaling an endpoint that was participating in the one or more IP calls.

2. The method of claim 1, wherein detecting an outage comprises detecting an unplanned outage or a planned outage associated with an upgrade of the call agent process.

3. The method of claim 1, wherein internally re-establishing the one or more IP calls is performed when the first type of activity includes keepalive messages that are received at the call agent process from an endpoint.

4. The method of claim 1, wherein fully re-establishing the one or more IP calls is performed when the second type of activity includes registration messages that are received at the call agent process from an endpoint indicating that the endpoint is seeking full registration with the call agent process.

5. The method of claim 4, wherein the signaling includes sending Invite and Replace messages to the endpoints that were involved in an IP call during the outage.

6. The method of claim 1, further comprising, after internally re-establishing the one or more IP calls or after fully re-establishing the one or more IP calls, exchanging context produced by the device simulator process with an endpoint that was participating in the one or more IP calls.

7. The method of claim 1, wherein the call agent process is an active call agent process running on the server, and further comprising:
   replicating the set of data associated with the one or more IP calls to persistent memory for each of a plurality standby call agent processes;
   upon detecting the outage, promoting one of the plurality of standby call agent processes to be a promoted active call agent process;
   wherein the resynthesizing, internally re-establishing or fully re-establishing is performed by the promoted active call agent process.

8. The method of claim 7, wherein the active call agent process and the promoted active call agent process are running in a same data center or in different data centers.

9. The method of claim 7, further comprising selecting the standby call agent process of the plurality of standby call agent processes to be the promoted active call agent process.

10. The method of claim 7, further selecting a sequence of standby call agent processes of the plurality of standby call agent processes to promote so as to minimize an amount of switchovers during an upgrade outage.

11. An apparatus comprising:
    a communication interface;
    a non-transitory memory storing instructions for a call agent process to support one or more Internet Protocol (IP) calls between a plurality of endpoints;
    a persistent memory; and
    a processor coupled to the communication interface and the non-transitory memory and the persistent memory, the processor configured to:
       store to persistent memory a set of data associated with the one or more IP calls supported by the call agent process;
       detect an outage affecting the one or more IP calls;
       using the data associated with the one or more IP calls retrieved from the persistent memory, resynthesize the one or more IP calls using a device simulator process at the apparatus to simulate connectivity with the plurality of endpoints that were participating in the one or more IP calls supported by the call agent process prior to the outage without communicating over a socket connection; and
       after resynthesizing, re-establish the one or more IP calls with the plurality of endpoints depending on activity detected from devices associated with the one or more IP calls, including:
          upon detecting a first type of activity from the devices associated with the one or more IP calls, internally re-establish the one or more IP calls with the plurality of endpoints involved in the one or more IP calls without signaling an endpoint that was participating in the one or more IP calls; and
          upon detecting a second type of activity from the devices associated with the one or more IP calls, fully re-establish the one or more IP calls by signaling an endpoint that was participating in the one or more IP calls.

12. The apparatus of claim 11, wherein the processor is configured to internally re-establish the one or more IP calls when the first type of activity includes keepalive messages that are received from an endpoint, and
    wherein the processor is configured to fully re-establish the one or more IP calls when the second type of activity includes registration messages that are received from an endpoint indicating that the endpoint is seeking full registration with the call agent process.

13. The apparatus of claim 12, wherein the signaling includes Invite and Replace messages to the endpoints that were involved in an IP call during the outage.

14. The apparatus of claim 11, wherein the processor is configured to, after internally re-establishing the one or more IP calls or fully re-establishing the one or more IP calls, exchange context produced by the device simulator process with an endpoint that was participating in the one or more IP calls.

15. A system comprising the apparatus of claim 11, wherein the call agent process is an active call agent process, and further comprising a plurality of standby call agent processes running on one or more respective servers, wherein the processor is configured to replicate the set of data associated with the one or more IP calls to persistent memory for each of the plurality standby call agent processes; and wherein
   upon detecting the outage, one of the plurality of standby call agent processes is a promoted active call agent process, and wherein the resynthesize, internally re-establish or fully re-establish operations are performed by the promoted active call agent process.

16. The system of claim 15, wherein the active call agent process and the promoted active call agent process are running in a same data center or in different data centers.

17. One or more non-transitory computer readable storage media encoded with instructions that, when executed by a processor, cause the processor to perform operations comprising:
   at a call agent process running on a server to support one or more Internet Protocol (IP) calls between a plurality of endpoints, storing to persistent memory a set of data associated with the one or more IP calls;
   detecting an outage affecting the one or more IP calls;
   using the data associated with the one or more IP calls retrieved from the persistent memory, resynthesizing the one or more IP calls using a device simulator process at the server to simulate connectivity with the plurality of endpoints that were participating in the one or more IP calls supported by the call agent process prior to the outage without communicating over a socket connection; and
   after resynthesizing, re-establishing the one or more IP calls with the plurality of endpoints depending on activity detected from devices associated with the one or more IP calls, including:
      upon detecting a first type of activity from the devices associated with the one or more IP calls, internally re-establishing the one or more IP calls with the plurality of endpoints involved in the one or more IP calls without signaling an endpoint that was participating in the one or more IP calls; and
      upon detecting a second type of activity from the devices associated with the one or more IP calls, fully re-establishing the one or more IP calls by signaling an endpoint that was participating in the one or more IP calls.

18. The computer readable storage media of claim 17, wherein the internally re-establishing the one or more IP calls is performed when the first type of activity includes keepalive messages that are received from an endpoint, and
   wherein the fully re-establishing the one or more IP calls is performed when the second type of activity includes registration messages that are received from an endpoint indicating that the endpoint is seeking full registration with the call agent process.

19. The computer readable storage media of claim 18, wherein the signaling includes Invite and Replace messages to the endpoints that were involved in an IP call during the outage.

20. The computer readable storage media of claim 17, wherein the instructions are operable for, after internally re-establishing the one or more IP calls or fully re-establishing the one or more IP calls, exchanging context produced by the device simulator process with an endpoint that was participating in the one or more IP calls.

* * * * *